(12) United States Patent
Gandhi

(10) Patent No.: US 9,409,329 B2
(45) Date of Patent: Aug. 9, 2016

(54) METHOD AND APPLICATION FOR CONTROLLING ALIGNMENT OF FIBERS DURING INJECTION MOLDING PROCESS

(75) Inventor: Umesh N. Gandhi, Farmington Hills, MI (US)

(73) Assignee: Toyota Motor Engineering & Manufacturing North America, Inc., Erlanger, KY (US)

( * ) Notice: Subject to any disclaimer, the term of this patent is extended or adjusted under 35 U.S.C. 154(b) by 786 days.

(21) Appl. No.: 13/528,923

(22) Filed: Jun. 21, 2012

(65) Prior Publication Data

US 2013/0341837 A1    Dec. 26, 2013

(51) Int. Cl.
*B29C 45/18* (2006.01)
*B29C 45/00* (2006.01)
*B29C 45/17* (2006.01)

(52) U.S. Cl.
CPC ......... *B29C 45/0005* (2013.01); *B29C 45/1701* (2013.01); *B29C 2791/005* (2013.01)

(58) Field of Classification Search
CPC ............... B29C 2791/005; B29C 45/0005; B29C 45/1701

USPC ........................................ 425/174; 264/437
See application file for complete search history.

(56) References Cited

U.S. PATENT DOCUMENTS

| 5,017,312 A | 5/1991 | Peters et al. |
| 5,846,356 A * | 12/1998 | Vyakarnam ............ B29C 70/14 156/273.1 |
| 7,862,765 B2 | 1/2011 | Hwang et al. |
| 2015/0134061 A1 * | 5/2015 | Friis ........................ H01L 41/37 623/17.11 |

OTHER PUBLICATIONS

Dr. C. Barry, Template-guided Self-assembly of Conductive Plastic in an Electric Field during Injection Molding, Research Experiences for Teachers at Northeastern University, www.ret.neu.edu/NSTA-Baltimore'06/posters/Jessica_Quinn.ppt.

* cited by examiner

*Primary Examiner* — Robert J Grun
(74) *Attorney, Agent, or Firm* — Christopher G. Darrow; Darrow Mustafa PC

(57) ABSTRACT

A method of controlling the orientation of glass or plastic reinforcing fibers in an injection molded polymeric/fiber article including the step of applying a high electric field to at least a portion of the mold cavity during the injection of the fiber/polymer mix and during a setup or packing time preceding the ejection of the article from the mold.

12 Claims, 2 Drawing Sheets

FIG. 1
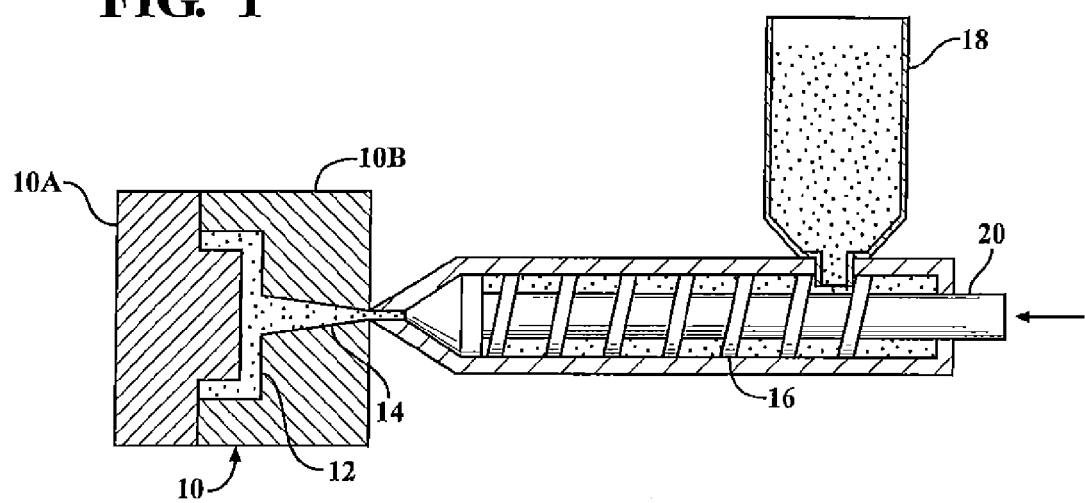
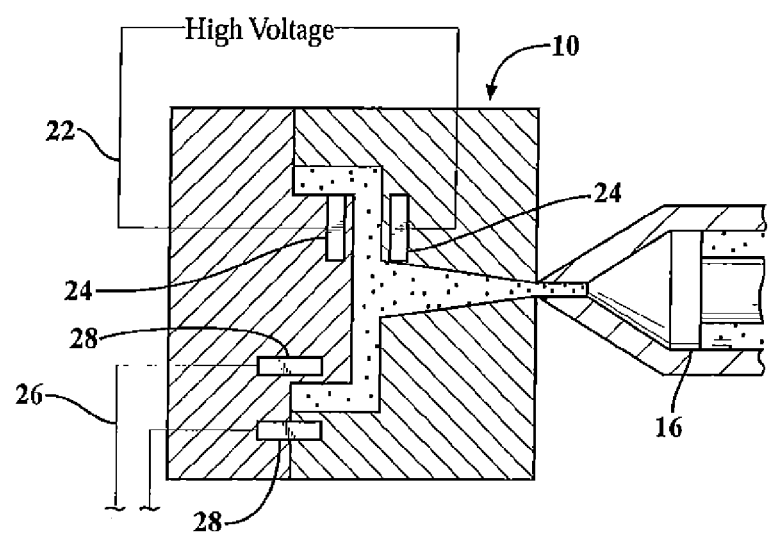
FIG. 2

METHOD AND APPLICATION FOR CONTROLLING ALIGNMENT OF FIBERS DURING INJECTION MOLDING PROCESS

FIELD OF THE INVENTION

The invention relates to the injection molding of fiber reinforced polymeric articles and more particularly to the use of an electric field to produce a preferred alignment of the reinforcing fibers as they arrive in the mold cavity.

BACKGROUND OF THE INVENTION

The use of fibers having a high aspect ratio to reinforce molded polymeric (plastic) articles is well known. The reinforcing fibers may be glass or polymeric and are often the product of a "chopping" process which can produce a distribution of fiber lengths. The fibers are mixed into the polymer while in a molten state and thereafter the mix is caused to flow into a die or mold cavity without significant attention being paid to the alignment or orientation of the reinforcing fibers in the article. This can result in significant variations in the physical properties of the molded articles.

SUMMARY OF THE INVENTION

According to the present invention, the orientation or "alignment" of reinforcing fibers such as glass or other fibers in an injection molded polymeric article is controlled while introducing the fibers and polymer medium into the mold cavity. This is achieved by applying a high voltage electric field to at least one or more portions of a mold apparatus such as the mold cavity defining the article during the injection step or an inflow channel connected to the cavity. The field is maintained and for a short setup time immediately following the fill or "packing" of the mold cavity. The field is thereafter removed, the mold cavity opened and the article recovered.

In an illustrative embodiment hereinafter described in detail, the reinforcing fibers are glass with a length between about 4 and 7 mm and the electric field is between about 1 and 5 kV per mm of electrode length. For a typical article, the packing time is on the order of 30 sec. to 2 or 3 min.

Other advantages, features and characteristics of the present invention, as well as methods of operation and functions of the related elements of the structure, and the combination of parts and economies of manufacture, will become more apparent upon consideration of the following detailed description and the appended claims with reference to the accompanying drawings, the latter being briefly described hereinafter.

BRIEF SUMMARY OF THE DRAWINGS

The description herein makes reference to the accompanying drawings wherein like reference numerals refer to like parts throughout the several views and wherein:

FIG. 1 is a diagram of a molding apparatus using a screw-type injector;

FIG. 2 is a diagram of a portion of the molding apparatus showing how an electric field is applied to two portions of a mold cavity;

DETAILED DESCRIPTION OF THE ILLUSTRATIVE EMBODIMENT

Figure 3:
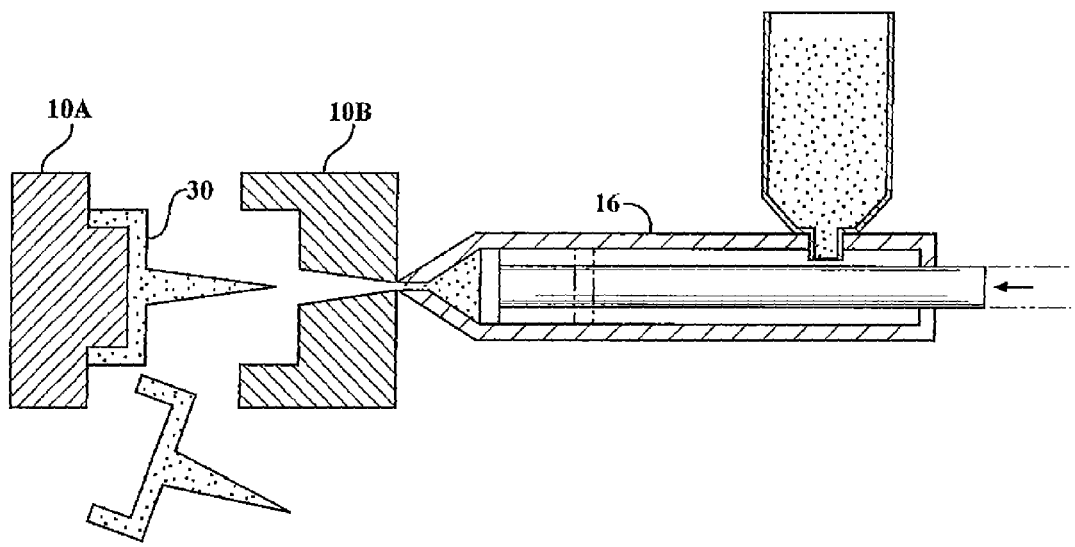
FIG. 3 is a diagram of the article ejection or recovery step using a ram-type injector.

Referring to FIG. 1, the mold 10 is shown to have interfitting left and right parts 10A and 10B which together define a mold cavity 12 which in turn defines an article 30 to be injection molded therein. A sprue 14 defines an inlet path for a mix of molten plastic and glass reinforcing fibers introduced by an injector 16 connected to a plastic/fiber source 18. The injection step is effectuated by a screw 20 which is part of the injector 16. As stated above, the fibers may be glass or polymeric or any non-conductive material.

As shown in FIG. 2, the mold cavity defines an article having two discrete elongate portions, the first portion extending in opposite directions and laterally away from the sprue area 14 in a symmetrical fashion and the second portion being defined by appendages at the distal ends of the first portions. A first set of electrodes 24 is arranged on opposite sides of the first elongate portion of the mold cavity and connected by a circuit 22 to a high voltage source. A second set of electrodes 28 is connected in a circuit 26 to the high voltage source and arranged on opposite sides of the second elongate portion of the article 30 to be molded. In this case, the electrodes are flat and parallel to one another, but other orientations can be used. The flat electrode sets result in linear, parallel fiber alignment in a direction generally parallel to the elongate section or sections of the molded article, but it may be desirable to produce other alignment directions such as a radial alignment. This can be done with the combination of a circular outer electrode and a smaller center electrode. The injector 16 is used to inject the molten polymer/fiber mix into the mold cavity while the high voltage source supplies a field across the mold cavity portions by way of the electrode sets 24, 28. After a setup time of between 30 sec. and about 3 min., the mold portions 10A and 10B are separated and the part 30 is recovered while the injector pressure is relaxed. While only one set of electrodes is shown for each elongate section, it will be understood that additional electrodes may be used to achieve different results.

Figure 4:
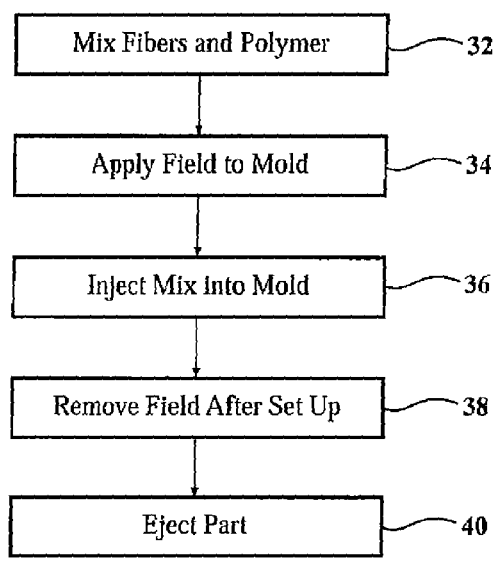
FIG. 4 is a diagram of a flow chart of a method used to carry out an illustrative embodiment of the invention.

Referring to FIG. 4, the individual steps of the subject process will be hereinafter defined.

In step 32, glass reinforcing fibers of between about 4 and 7 mm. in length are mixed into suitable injectable polymer such as polyethylene, polypropylene or other thermoplastic. In step 34, a high voltage DC field of between about 1 and 5 kV per mm of electrode length, depending on the size of the mold cavity, the type and size of the fibers, and viscosity of the molten polymer matrix, is applied to at least portions of the mold cavity by way of electrodes arranged around the cavity essentially as represented by the example of FIG. 2, it being understood that this is merely one example of how electrodes might be oriented about a mold cavity to define a part of a particular configuration. The field is applied as the polymer/fiber mix is injected into the mold cavity as represented by step 36. The person of ordinary skill in the art will understand that the strength of the electric field will depend on numerous factors, including the viscosity of the molten polymer matrix and the type and size of the fibers.

After a setup time of between 30 sec. and 2-3 min., during which the field is continuously applied, the field is removed as shown in step 38. In step 40, the mold is opened in FIG. 3 and the part is ejected.

The selection of fiber lengths and the distribution of those fiber lengths can be optimized through the use of the method described in the co-pending application, Ser. No. 13/528,914, filed concurrently herewith and now issued as U.S. Pat. No. 8,915,377, the disclosure of which is incorporated herein by reference.

While the invention has been described in connection with what is presently considered to be the most practical and preferred embodiment, it is to be understood that the invention is not to be limited to the disclosed embodiments but, on the contrary, is intended to cover various modifications and equivalent arrangements included within the spirit and scope of the appended claims, which scope is to be accorded the broadest interpretation so as to encompass all such modifications and equivalent structures as is permitted under the law.

What is claimed is:

1. A method of controlling the alignment of reinforcing fibers in an injection molded polymeric article, the method comprising the steps of:

applying a DC electric field to at least one area of a mold apparatus and, thereafter, injecting a fluidized polymer containing substantially unaligned non-conductive reinforcing fibers into the mold apparatus while maintaining the applied DC electric field, orienting the non-conductive reinforcing fibers in a linear, parallel alignment in a direction generally parallel to an elongate portion of the mold apparatus.

2. The method as defined in claim 1 wherein the mold apparatus defines a mold cavity and the method comprises the further step of maintaining the applied electric field during a setup period after injection of the fluidized polymer into the mold cavity.

3. The method as defined in claim 2 wherein the electric field is maintained for a setup period between about 30 seconds and 3 minutes.

4. The method as defined in claim 1 wherein the reinforcing fibers comprise glass or a non-conductive polymer.

5. The method as defined in claim 1 wherein an average length of the reinforcing fibers is between about 4 mm and 7 mm.

6. The method as defined in claim 1 wherein the DC electric field has a field strength between about 1 kV per mm and 5 kV per mm of electrode length.

7. A method of controlling the alignment of reinforcing fibers in an injection molded polymeric article having at least one elongate portion, the method comprising the steps of:

a. applying a DC electric field across an elongate portion of a mold cavity;

b. injecting a fluidized mix of polymers and substantially unaligned non-conductive reinforcing fibers into the mold cavity while maintaining the DC electric field, orienting the non-conductive reinforcing fibers in a linear, parallel alignment in a direction generally parallel to the elongate portion of the mold cavity; and c. continuously applying the DC electric field during a setup period after injecting the fluidized mix.

8. The method as defined in claim 7 wherein the setup period is between about 30 seconds and 3 minutes.

9. The method as defined in claim 7 wherein the reinforcing fibers comprise glass or a non-conductive polymer.

10. The method as defined in claim 7 wherein an average length of the reinforcing fibers is between about 4 mm and 7 mm.

11. The method as defined in claim 7 wherein the DC electric field has a field strength between about 1 kV per mm and 5 kV per mm of electrode length.

12. A method of orienting non-conductive reinforcing fibers in an injection molding process, the method comprising:

preparing a mixture of an injectable polymer and substantially unaligned, non-conductive reinforcing fibers having an average length between about 4 mm and 7 mm;

applying a high voltage DC electric field across a set of electrodes arranged on opposite sides of an elongate portion of a mold apparatus, the high voltage DC electric field having a field strength between about 1 kV per mm and 5 kV per mm of electrode length;

injecting the mixture into the elongate portion while continuing to apply the high voltage DC electric field, orienting the non-conductive reinforcing fibers disposed adjacent the elongate portion in a linear, parallel alignment in a direction generally parallel to the elongate portion;

maintaining the high voltage DC electric field for a setup time between about 30 seconds and 3 minutes after injecting the mixture and forming a polymeric article; and removing the high voltage DC electric field and ejecting the polymeric article.

* * * * *